(12) United States Patent
Jaw

(10) Patent No.: US 7,232,378 B2
(45) Date of Patent: Jun. 19, 2007

(54) SHOCK-ABSORBABLE GRIP

(76) Inventor: Leo Jaw, No. 32, Sec. 4, Shatian Rd., Longjing Township, Taichung County (TW) 434

( * ) Notice: Subject to any disclaimer, the term of this patent is extended or adjusted under 35 U.S.C. 154(b) by 162 days.

(21) Appl. No.: 10/999,983

(22) Filed: Dec. 1, 2004

(65) Prior Publication Data

US 2006/0116215 A1 Jun. 1, 2006

(51) Int. Cl.
*A63B 53/14* (2006.01)
(52) U.S. Cl. .................................... 473/300
(58) Field of Classification Search ................ 473/300, 473/301, 302, 303, 549, 550, 568
See application file for complete search history.

(56) References Cited

U.S. PATENT DOCUMENTS 6,449,803 B1 * 9/2002 McConchie .................. 16/431
6,656,057 B2 * 12/2003 Manual et al. ............... 473/300
6,815,028 B2 * 11/2004 Huang ........................ 428/40.1
6,857,971 B2 * 2/2005 Huang ......................... 473/300
6,908,400 B2 * 6/2005 Chu et al. .................... 473/303

* cited by examiner

Primary Examiner—William M. Pierce
(74) Attorney, Agent, or Firm—Bacon & Thomas PLLC

(57) ABSTRACT

A shock-absorbable grip is comprised of a sleeve and a sheathing. The sleeve includes a hollow main body for being mounted on a handle of the sporting apparatus and having a front retainer and a rear retainer protuberating respectively at its front and rear ends. The sheathing wraps the main body between the front and rear retainers, having a slope matching face formed at an edge of its one short side, a top side for holding by the user, and a bottom side mounted on an external periphery of the main body. The front retainer has a slope face closely mounted with the slop matching face.

3 Claims, 5 Drawing Sheets

SHOCK-ABSORBABLE GRIP

BACKGROUND OF THE INVENTION

1. Field of the Invention

The present invention relates generally to sporting apparatuses, and more particularly to a shock-absorbable grip of a handle of a sporting apparatus.

2. Description of the Related Art

Referring to FIG. 1, a conventional shock-absorbable grip applicable to a handle 1 of a golf club is comprised of an elongated hollow sleeve 2 and an elongated trapezoid-shaped sheety sheathing 3. The sleeve 2 is made of rubber and sleeved onto the handle 1, having a front retainer 2a and a rear retainer 2b formed respectively at a front end thereof and a rear end thereof. The front retainer 2a and the rear retainer 2b each have a retaining sidewall 2c(2d) perpendicular to the sheathing 3. The sheathing 3 is located between the front and the rear retainers 2a and 2b to fully wrap the sleeve 2, having an external periphery for holding by the user. To facilitate the wrapping operation and to prevent any of protuberance occurred while the sheathing 3 is partially mounted on the front and rear retainers 2a and 2b, a length between two short sides of the sheathing 3 is generally cut shorter than that between the retaining sidewalls 2c and 2d. However, there is a gap A, as shown in FIG. 2, formed between a lateral side of the sheathing 3 and each of the retainers 2a and 2b to not only get dirty easily but also aesthetically spoil the appearance of the grip.

Another conventional grip, as shown in FIG. 3, is produced by an elongated strap 4 wound around the sleeve 2, which retaining sidewall 2c stops further winding of the strap 4 to enable the strap 4 to stop at the front retainer 2a to form a gap B, however resulting in the same drawback as mentioned above.

SUMMARY OF THE INVENTION

The primary objective of the present invention is to provide a shock-absorbable grip for a sporting apparatus to eliminate the drawback of the prior art.

The foregoing objective of the present invention is attained by the shock-absorbable grip, which is comprised of a sleeve and a sheathing. The sleeve includes a hollow main body for being mounted on a handle of the sporting apparatus and having a front retainer and a rear retainer protuberating respectively at its front and rear ends. The sheathing wraps the main body between the front and rear retainers, having a slope matching face formed at an edge of its one short side, a top side for holding by the user, and a bottom side mounted on an external periphery of the main body. The front retainer has a slope face closely mounted with the slop matching face.

DETAILED DESCRIPTION OF PREFERRED EMBODIMENTS

Figure 1:
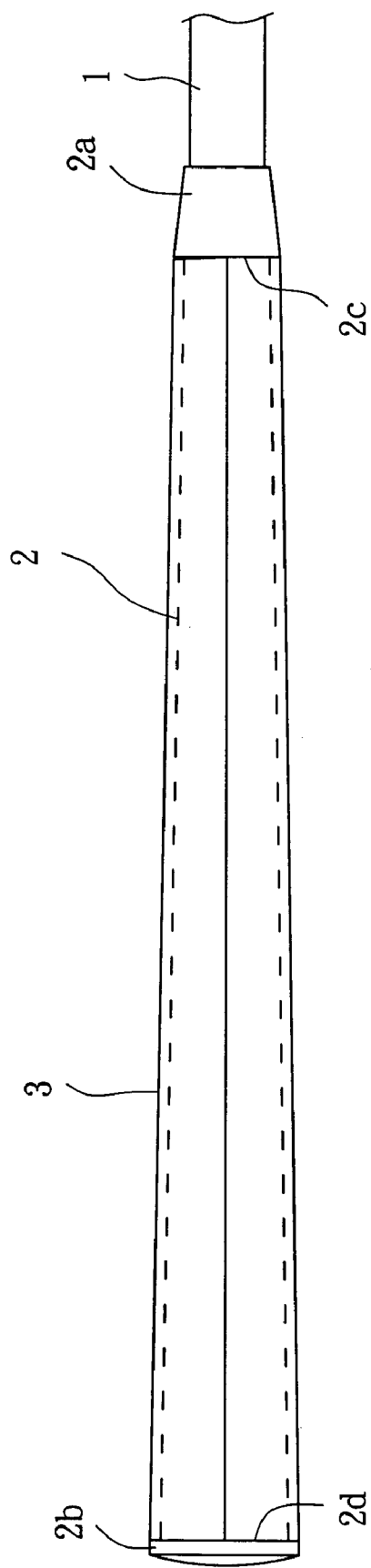
FIG. 1 is a schematic view of a conventional shock-absorbable grip.
Figure 2:
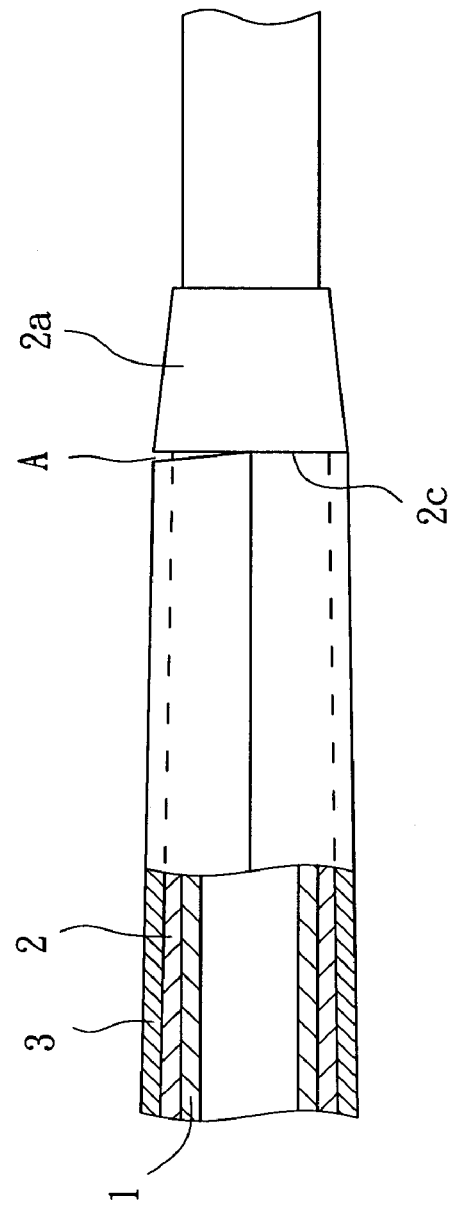
FIG. 2 is a partial enlarged view of FIG. 1.
Figure 3:
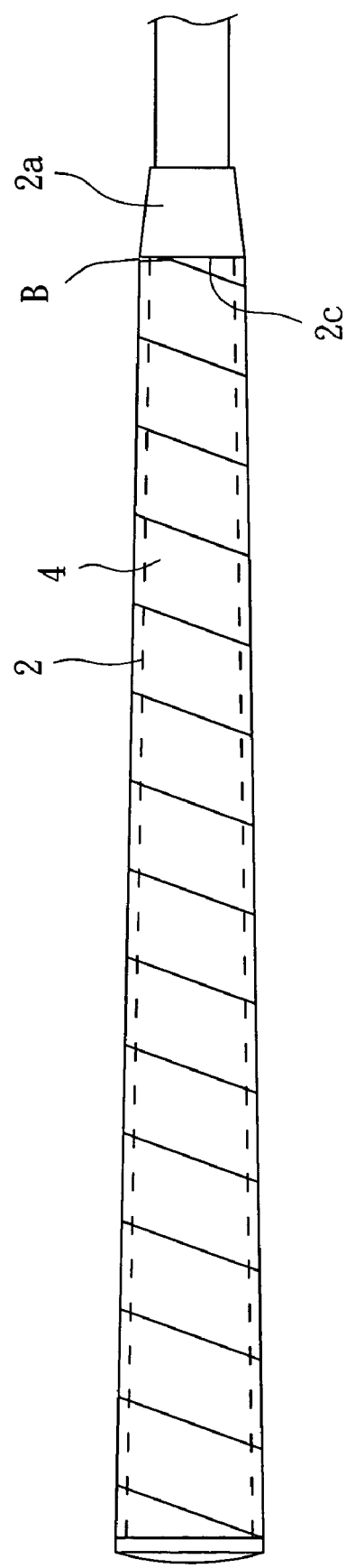
FIG. 3 is another conventional shock-absorbable grip.
Figure 4:
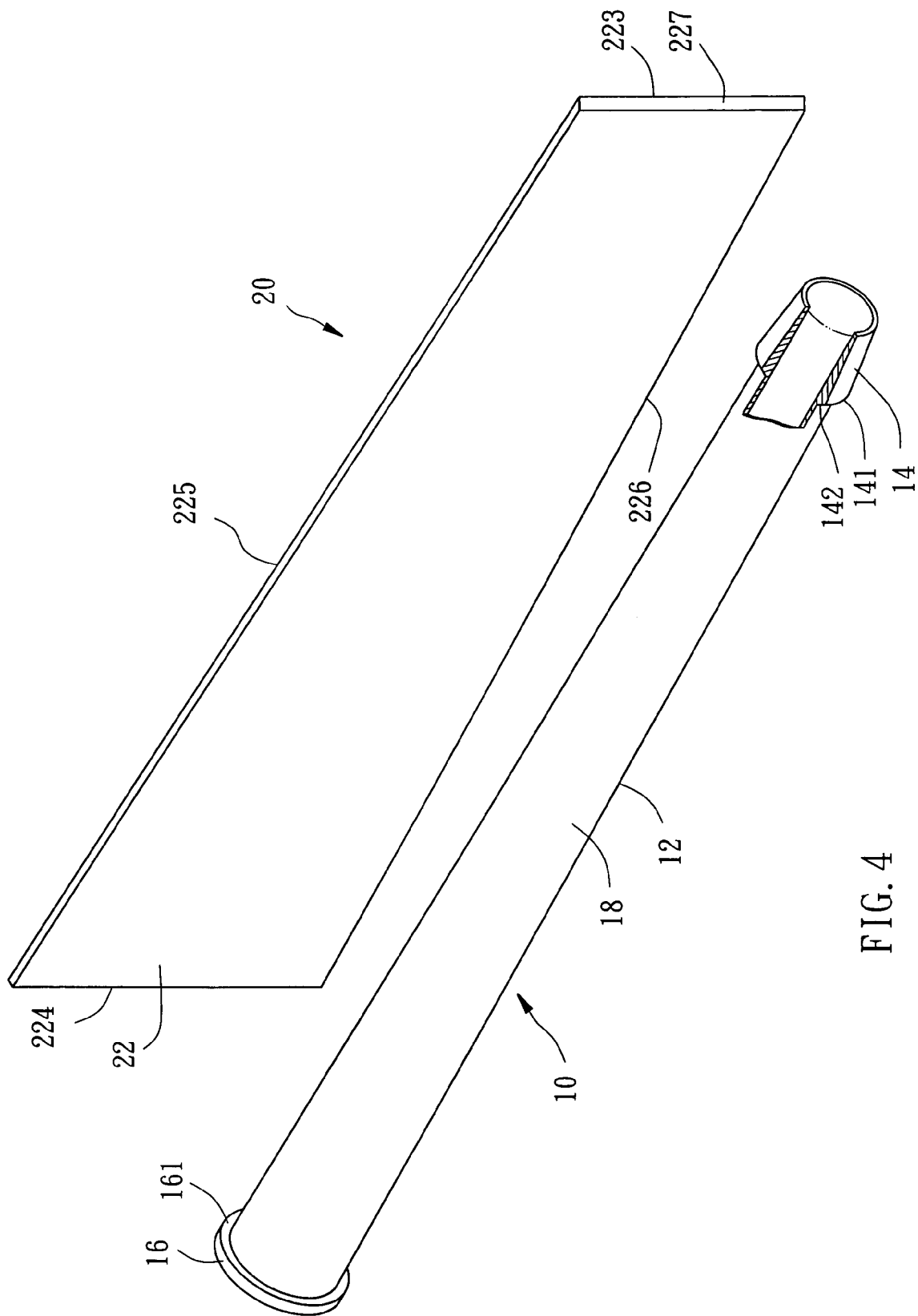
FIG. 4 is a perspective and partial sectional and exploded view of a first preferred embodiment of the present invention.
Figure 5:
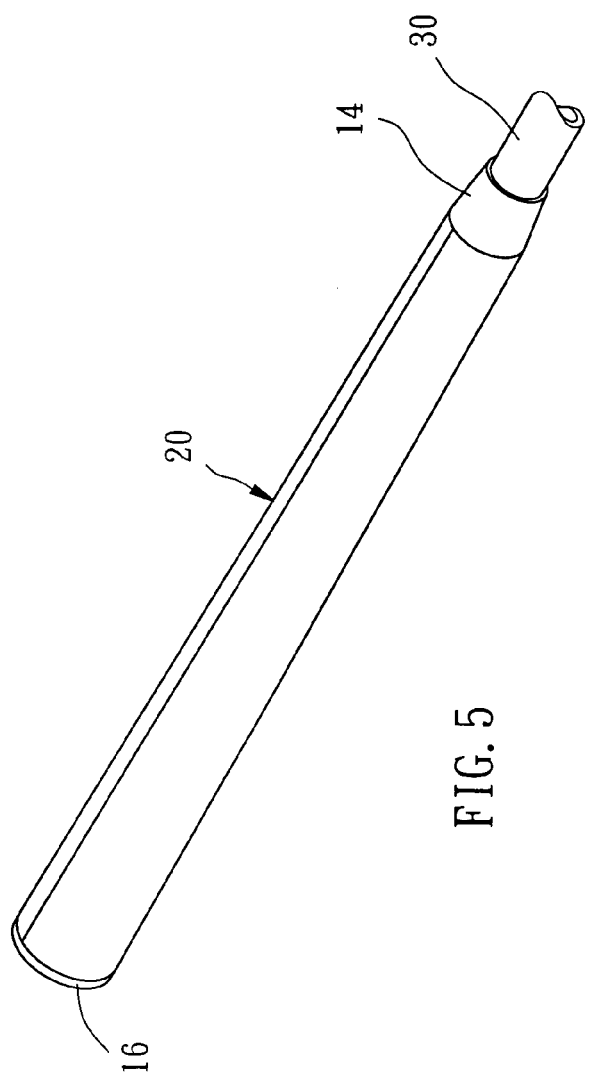
FIG. 5 is a perspective view of the first preferred embodiment of the present invention.
Figure 6:
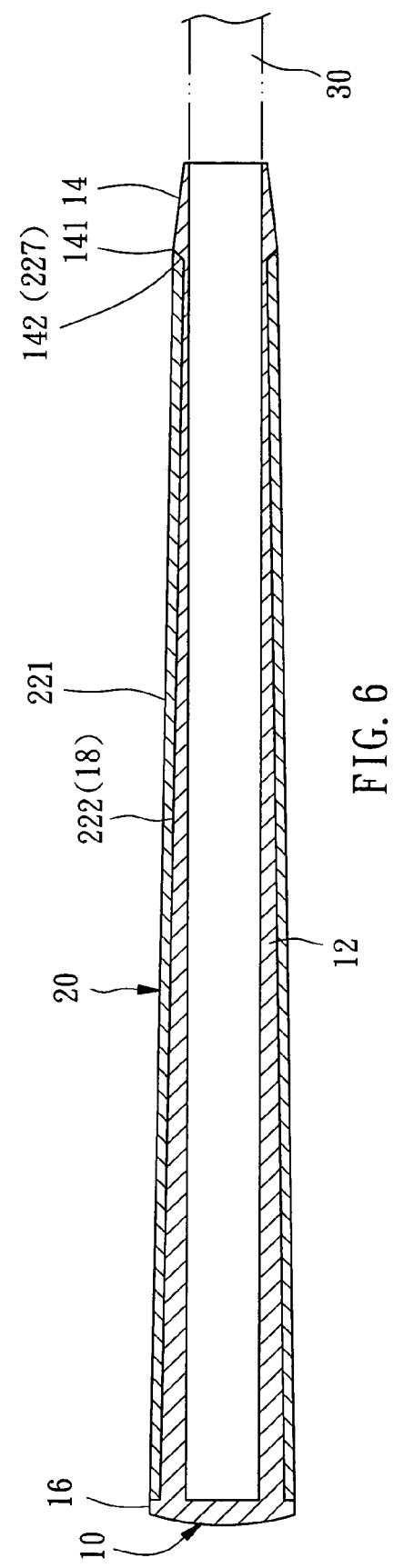
FIG. 6 is a sectional view of the first preferred embodiment of the present invention.

Referring to FIGS. 4–6, a shock-absorbable grip constructed according to a first preferred embodiment of the present invention is comprised of a sleeve 10 and a sheathing 20, being applicable to a handle of a sporting apparatus, which is embodied as a golf club.

The sleeve 10 includes a hollow elastic main body 12 sleeved onto a tapered handle 30 of the golf club and being as long as the handle 30. The main body 12 has an annular tapered front retainer 14 and an annular rear retainer 16 protuberating respectively at its front and rear ends, and a recessed section 18 formed between the two retainers 14 and 16, as shown in FIG. 4. The front retainer 14 has an increasing outer diameter from its front end towards its rear end, which defines an annular ridge 141 having a largest outer diameter, and a rear facing sloped sidewall 142 formed closely between the annular ridge 141 and the recessed section 18 and meeting with the recessed section 18 at an obtuse angle, and a retaining sidewall 161 formed closely between the rear retainer 16 and the recessed section 18 and meeting with the recessed section 18 at right angles. The outer diameter of each of the front and rear retainers 14 and 16 is larger than that of the recessed section 18 of the main body 12.

The sheathing 20 is an elongated sheet member 22 made of a material, such as fabric, nonwoven fabric, natural leather, synthetical leather, or a compound of cork dust and bonding agent, including a top side 221, a bottom side 222, two short sides 223 and 224, and two long sides 225 and 226. The distance between the two short sides 223 and 224 is substantially identical to that between the annular ridge 141 and the retaining sidewall 161. A slope matching face 227 is formed on the short side 223. The two long sides 225 and 226 are slopingly formed to correspond to the tapered handle 30, as shown in FIG. 6. The sheet member 22 fully wraps the recessed section 18 of the main body 12 between the two retainers 14 and 16. The bottom side 222 of the sheet member 22 is in close contact with an external periphery of the recessed section 18. The slope matching face 227 is closely mounted on the sloped sidewall 142 of the front retainer 14 of the main body 12. The top side of 221 is provided for holding by the user.

For wrapping the sheet member 22 securely around the main body 12, either the bottom side of the sheet member 22 can be connected with the external periphery of the main body 12 by glue or adhesive tap or the two long sides 225 and 226 can be connected by, for example, high-frequency adhesion or stitching.

From the above recitation, the present invention employs the interconnection of the sloped sidewall 142 of the front retainer 14 and the slope matching face 227 of the sheet member 22 to not only facilitate and smooth the wrapping operation but also avoid any of the protuberance occurred on the appearance thereof. Further, none of the drawback, i.e. the gap, is incurred in the present invention.

Figure 7:
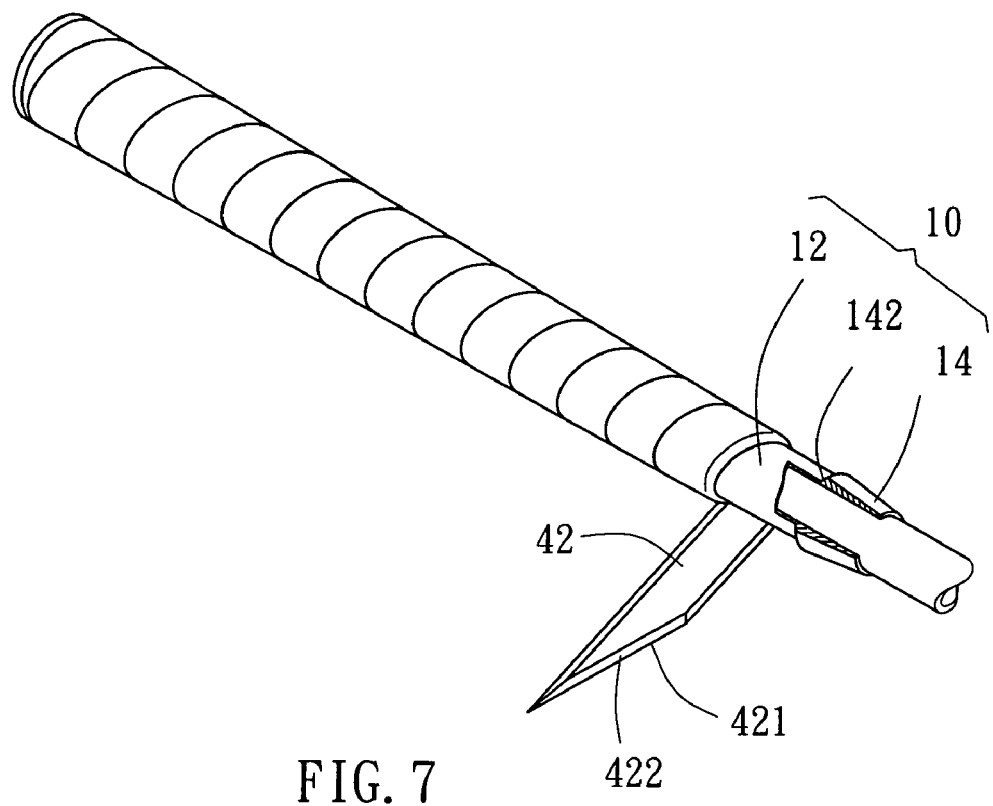
FIG. 7 is a perspective and partial sectional view of a second preferred embodiment of the present invention.
Figure 8:
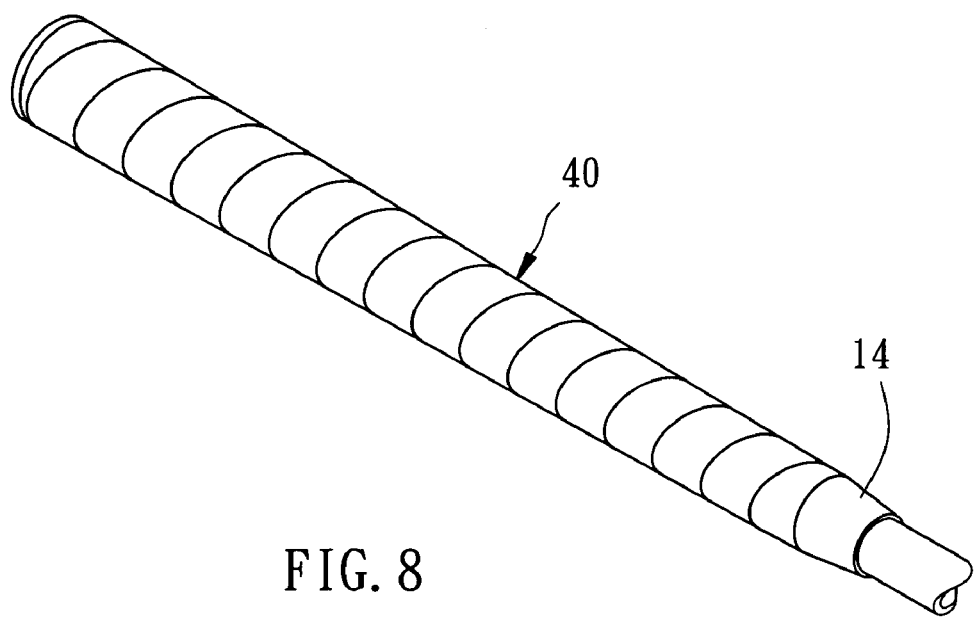
FIG. 8 is a perspective view of the second preferred embodiment of the present invention.

Referring to FIGS. 7 and 8, the shock-absorbable grip constructed according to a second preferred embodiment of the present invention is similar to the first embodiment, but having difference as recited below. The sheathing 40 is formed of an elongated strap 42, which includes a sloped side 421 formed at a distal end thereof and a matching face 422 formed on the sloped side 421. At the end of winding the strap 42 around the sleeve 10 fitted onto the handle 30, the matching face 422 is closely mounted on the sloped side 142, thereby accomplishing the shock-absorbable grip of the present invention.

What is claimed is:

1. A shock-absorbable grip for a handle of a sporting exerciser, said grip comprising:

a sleeve having a hollow main body for being fitted onto said handle, a front retainer protuberating from a front end of said main body, and a rear retainer protuberating from a rear end of said main body, the front retainer having a rear facing sloped side wall; and an elastic sheathing wrapping said main body and located between said front and rear retainers, said sheathing having a matching face, a top side, and a bottom side, said matching face being closely mounted on said sloped side wall of said front retainer, said bottom side being in contact with an external periphery of said main body, said top side being provided for holding by the user;

wherein said main body comprises a recessed section formed on the external periphery thereof between said front and rear retainers; said sheathing fully wraps said recessed section, said front retainer being tapered to have an increasing outer diameter from a front end towards to a rear end defining a ridge; said sloped side wall being located closely between said recessed section and said ridge, said rear retainer having a retaining sidewall perpendicular to said recessed section; and wherein said sheathing is a sheet member having two short sides and two long sides; said matching face of said sheathing is located on one of said short sides.

2. The grip as defined in claim 1, wherein said sheet member comprises a length between said two short sides, said length being identical to that between said ridge of said front retainer and said retaining sidewall of said rear retainer.

3. The grip as defined in claim 1, wherein said sheathing is an elongated strap comprising a sloped side formed at its distal end, said matching face formed on said sloped side.

\* \* \* \* \*